(12) United States Patent
Crooks

(10) Patent No.: US 10,946,710 B2
(45) Date of Patent: Mar. 16, 2021

(54) SYSTEMS AND METHODS FOR ALERTING DRIVERS OF EXCESSIVE TONGUE WEIGHT

(71) Applicant: Toyota Motor Engineering & Manufacturing North America, Inc., Plano, TX (US)

(72) Inventor: Dustin A. Crooks, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 162 days.

(21) Appl. No.: 16/058,504

(22) Filed: Aug. 8, 2018

(65) Prior Publication Data
US 2020/0047579 A1 Feb. 13, 2020

(51) Int. Cl.
*B60G 17/017* (2006.01)
*B60G 17/018* (2006.01)
*B60G 17/019* (2006.01)
*B60Q 9/00* (2006.01)

(52) U.S. Cl.
CPC ......... *B60G 17/017* (2013.01); *B60G 17/018* (2013.01); *B60G 17/019* (2013.01); *B60Q 9/00* (2013.01); *B60G 2400/252* (2013.01); *B60G 2400/60* (2013.01); *B60G 2400/97* (2013.01)

(58) Field of Classification Search
CPC .. B60G 17/017; B60G 17/018; B60G 17/019; B60G 2400/252; B60G 2400/60; B60G 2400/97; B60Q 9/00
See application file for complete search history.

(56) References Cited

U.S. PATENT DOCUMENTS

| 8,079,603 | B2 | 12/2011 | Voigtlaender et al. |
| 8,160,806 | B2 | 4/2012 | Salaka |
| 9,043,094 | B2 | 5/2015 | Wellhoefer et al. |
| 9,045,014 | B1* | 6/2015 | Verhoff ................... F41H 5/16 |
| 9,251,630 | B2* | 2/2016 | Denny ................. B60W 30/09 |
| 2008/0121438 | A1* | 5/2008 | Brown ................... G01G 19/08 |
| | | | 177/25.12 |
| 2010/0117320 | A1* | 5/2010 | Grozev ............. B60G 17/0523 |
| | | | 280/124.16 |
| 2013/0253814 | A1 | 9/2013 | Wirthlin |

(Continued)

FOREIGN PATENT DOCUMENTS

| DE | 102010004336 A1 | 3/2011 |
| GB | 2221047 A | 1/1990 |
| GB | 2543388 A | 4/2017 |

*Primary Examiner* — Aniss Chad
*Assistant Examiner* — Chase L Cooley
(74) *Attorney, Agent, or Firm* — Dinsmore & Shohl LLP

(57) ABSTRACT

A vehicle includes a suspension that includes a front suspension and a rear suspension, a trailer hitch configured to removably connect to a tongue of a trailer, at least one front suspension transducer configured to generate a front suspension displacement signal, at least one rear suspension transducer configured to generate a rear suspension displacement signal, and an electronic control unit. The electronic control unit is configured to receive the front suspension displacement signal, receive the rear suspension displacement signal, and generate an alert of an excessive tongue weight condition based on one or more of the front suspension displacement signal and the rear suspension displacement signal.

20 Claims, 6 Drawing Sheets

(56) References Cited

U.S. PATENT DOCUMENTS

| | | | |
|---|---|---|---|
| 2014/0110918 A1 | 4/2014 | McCoy | |
| 2015/0224845 A1* | 8/2015 | Anderson | B60G 17/052 |
| | | | 701/37 |
| 2017/0045137 A1* | 2/2017 | Dufford | B60W 30/18136 |
| 2017/0341583 A1* | 11/2017 | Zhang | B60R 1/00 |
| 2018/0118221 A1* | 5/2018 | Hall | B60W 10/22 |
| 2018/0154726 A1* | 6/2018 | Fida | B60G 17/017 |
| 2019/0180528 A1* | 6/2019 | Hall | G07C 5/008 |

\* cited by examiner

SYSTEMS AND METHODS FOR ALERTING DRIVERS OF EXCESSIVE TONGUE WEIGHT

TECHNICAL FIELD

The present specification generally relates to systems and methods for alerting drivers and, more specifically, to systems and methods for alerting drivers of an excessive tongue weight.

BACKGROUND

Vehicles may temporarily couple to a towed trailer at a trailer tongue. The weight and geometry of the vehicle, the weight and geometry of the trailer, and the connection between the two at the tongue may affect the performance of the vehicle and/or the trailer. For example, if the weight at the tongue is excessive, the vehicle may experience altered capabilities or performance. To avoid excessive tongue weight, systems and methods for alerting drivers of excessive tongue weight may be utilized. Accordingly, a need exists for systems and methods for alerting drivers of excessive tongue weight.

SUMMARY

In one embodiment, a vehicle includes a suspension that includes a front suspension and a rear suspension, a trailer hitch configured to removably connect to a tongue of a trailer, at least one front suspension transducer configured to generate a front suspension displacement signal, at least one rear suspension transducer configured to generate a rear suspension displacement signal, and an electronic control unit. The electronic control unit is configured to receive the front suspension displacement signal, receive the rear suspension displacement signal, and generate an alert of an excessive tongue weight condition based on one or more of the front suspension displacement signal and the rear suspension displacement signal.

In another embodiment, a vehicle includes a suspension, a trailer hitch configured to removably connect to a tongue of a trailer, at least one externally facing camera configured to generate a visual signal, and an electronic control unit. The electronic control unit is configured to receive the visual signal and generate an alert of an excessive tongue weight condition based on the visual signal.

In yet another embodiment, an electronic control unit for generating an excessive tongue weight alert for a vehicle is configured to receive a visual signal from at least one externally facing camera communicatively coupled to the electronic control unit and generate an alert of an excessive tongue weight condition based on the visual signal from the at least one externally facing camera.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
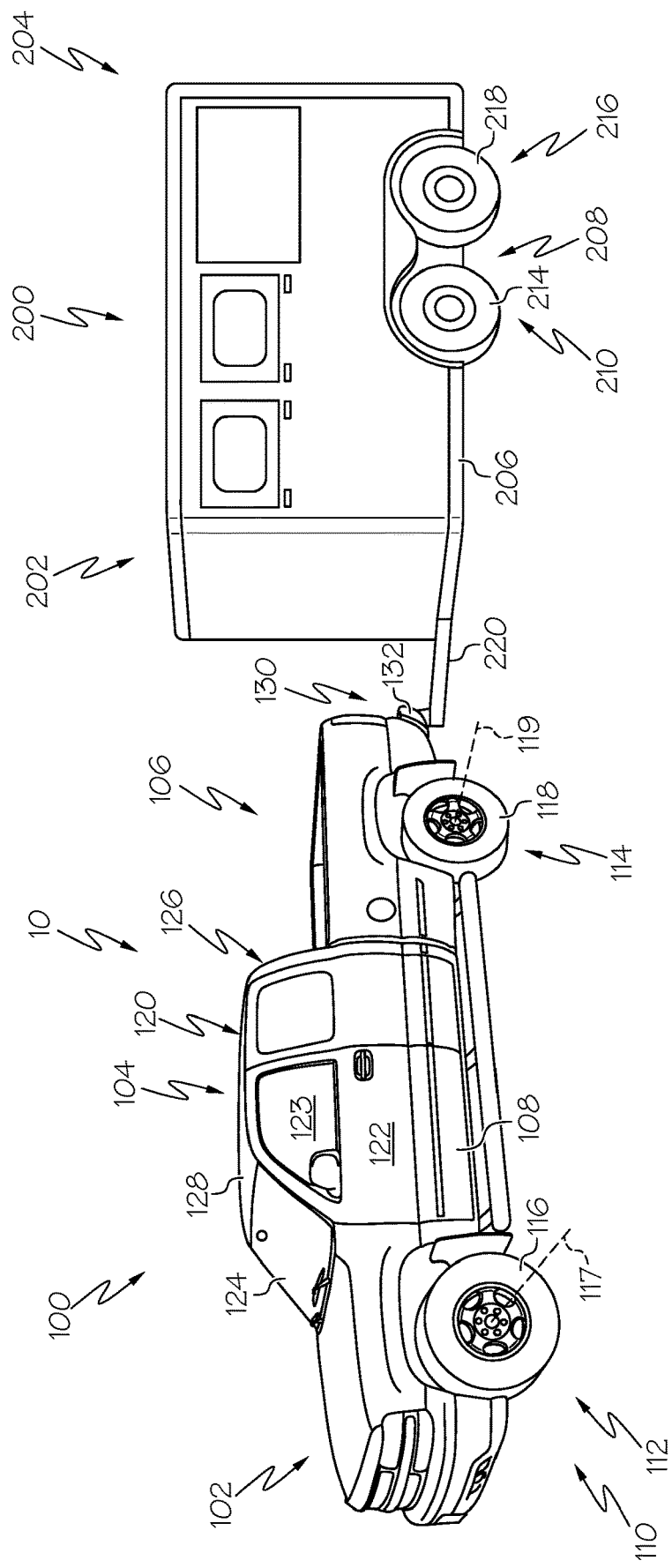
FIG. 1 depicts a vehicle including an excessive tongue weight alert system towing a trailer, according to one or more embodiments shown and described herein.

FIG. 1 generally depicts a vehicle towing a trailer. The trailer removably couples to the vehicle at a hitch of the vehicle and a tongue of the trailer. The vehicle includes an excessive tongue weight alert system that decreases the likelihood of a loss of vehicle control based on excessive trailer weight or other weight at the tongue. Excessive tongue weight may, among other things, affect the performance of the vehicle's suspension and/or drivetrain. The excessive tongue weight alert system may alert the driver or other passengers of the vehicle when an excessive tongue weight condition that may lead to a loss of vehicle control exists, thereby reducing the probability of a loss of vehicle control due to an excessive tongue weight condition.

Vehicles are often used to tow trailers that may contain items or equipment. Generally speaking, the vehicle will tow the trailer behind the vehicle, in a configuration in which a hitch of the vehicle is coupled to a tongue of the trailer. The weight of the trailer may vary depending on the contents of the trailer.

Both the vehicle and the trailer may comprise individual suspensions. Generally speaking, the vehicle will include a suspension that includes four wheels and four individual connections between the wheels and the frames. The suspension of the vehicle may be described in two halves, a front and a rear suspension, each half comprising two wheels. In some embodiments of the vehicle, the front suspension may comprise the steering mechanisms for the vehicle. Additionally, the vehicle drive mechanisms that propel the vehicle and the towed trailer down a roadway may couple to the wheels at the front suspension, the rear suspension, or both the front suspension and the rear suspension.

In some embodiments of the trailer, the trailer may contain one or more wheels that are individually connected to the trailer frame. The wheels of the vehicle and the wheels of the trailer may contact the ground providing support for the vehicle and the trailer. As the load profile of the trailer changes, so will the loads on the suspensions of the vehicle and the trailer. In embodiments, the weight of the trailer will be felt by the vehicle at the connection between the vehicle hitch and the trailer tongue (referred to herein as the "vehicle tongue" or simply the "tongue").

It is possible for the weight of the trailer to affect the performance of the vehicle. For example, the weight of the trailer may place an excessive load on the suspension of the vehicle. Because the hitch of the vehicle is located at the rear of the vehicle, the rear suspension may bear a greater share of the weight of the trailer while the vehicle is towing the trailer. The rear suspension may act as a sort of fulcrum, as the weight of the trailer pulls the rear of the vehicle downward and increases the load on the rear suspension and simultaneously decreases the load at the front suspension. In some instances, it might be possible for the weight of the trailer to lift the front wheels and front suspension of the vehicle off of the ground.

If the front suspension is lifted from the ground, it may experience little or no loading. In vehicles having drive mechanisms coupled to the front wheels, the vehicle could lose the capability to power itself using the front wheels. Moreover, in the case of a vehicle having a steering mechanism coupled to the front suspension, the capability to steer the vehicle may be degraded or completely lost. Accordingly, it may be desirable to reduce the potential for an excessive tongue weight condition at the connection between the vehicle and the trailer.

Referring now to FIG. 1, a vehicle 100 that includes an excessive tongue weight alert system 10 is depicted. The vehicle 100 is illustrated towing a trailer 200. The vehicle 100 includes a front section 102, a middle section 104, and a rear section 106 that are coupled to a vehicle frame 108 that includes a vehicle suspension 110. The vehicle suspension 110 may be divided between a front suspension 112 and a rear suspension 114. A pair of front wheels 116 may be coupled to the front suspension 112 at a front axle 117 (indicated by dashed line) and a pair of rear wheels 118 may be coupled to the rear suspension 114 at a rear axle 119 (indicated by dashed line).

The particular embodiment of the vehicle 100 depicted in FIG. 1 is shown as a truck, but embodiments are not so limited. It is contemplated that the systems and methods described herein may be implemented on any body style of vehicle, for example, a sedan, a coupe, a sport utility vehicle (SUV), or a van. Additionally, it is contemplated that the vehicle may have more or less than two wheels at the front and rear axles. For example, other embodiments of the vehicle 100 may include a single wheel at the front axle and/or a single wheel at the rear axle. In some embodiments, the vehicle 100 may include more than one axle with one or more wheels attached to the axle at the front suspension 112, the rear suspension 114, or both.

Still referring to FIG. 1, the middle section 104 of the vehicle 100 may include a cabin 120. The cabin 120 may be generally enclosed by one or more vehicle doors 122 that may or may not include vehicle windows 123, a windshield 124, a rear windshield 126, and a roof 128. The cabin 120 may include one or more seats for a driver and/or passengers of the vehicle 100. A driver and/or passengers of the vehicle 100 may sit within the cabin 120 while towing the trailer 200 behind the vehicle 100. The cabin 120 may include one or more displays, lights, speakers, haptic feedback devices, alarms, and/or other implementations for alerting a driver of an excessive tongue weight as will be described in greater detail herein.

The rear section 106 of the vehicle 100 may include a trailer hitch 130. The trailer hitch may extend from the rear suspension 114 or other portion of the vehicle frame 108 generally in the vehicle rearward direction. The trailer hitch 130 may comprise a ball hitch, a rear receiver hitch, a front mount hitch, a 5th wheel hitch, a gooseneck hitch, a pintle hitch, a bumper hitch, a weight distribution hitch, or some other type of vehicle hitch. The trailer hitch 130 may be configured to couple the trailer 200 to the vehicle 100 as described in greater detail herein.

Still referring to FIG. 1, the trailer 200 may include a front trailer section 202 and a rear trailer section 204. The trailer 200 may include a trailer frame 206 that includes a trailer suspension 208. The trailer suspension 208 may be divided between a front trailer suspension 210 and a rear trailer suspension 212. The front trailer suspension 210 may be coupled to a pair of front trailer wheels 214 at a front trailer axle. The front trailer axle may generally extend between the two wheels of the pair of front trailer wheels 214. The rear trailer suspension 216 may be coupled to a pair of rear trailer wheels 218 at a rear trailer axle. The rear trailer axle may generally extend between the two wheels of the pair of rear trailer wheels 218.

The front trailer section 202 may include a tongue 220. The tongue 220 may extend generally forward of the trailer 200. The tongue 220 may couple to the trailer hitch 130 at the rear of the vehicle 100. In some embodiments, a connection 132 between the tongue 220 and the trailer hitch 130 is the only coupling between the vehicle 100 and the trailer 200. In such embodiments, the entire weight of the trailer 200 may be borne by the vehicle 100 at the connection 132 between the tongue 220 and the trailer hitch 130 and the wheels of the trailer, such as front trailer wheels 214 and rear trailer wheels 218.

Figure 2A:
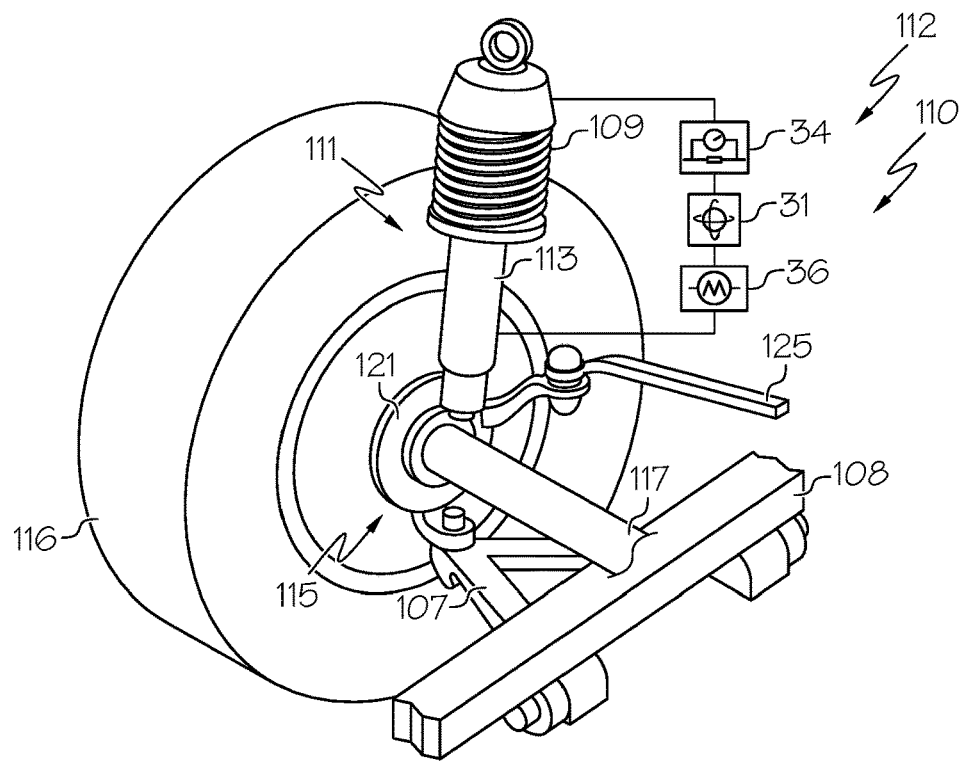
FIG. 2A depicts a schematic of a front suspension of the vehicle of FIG. 1, according to one or more embodiments shown and described herein.
Figure 2B:
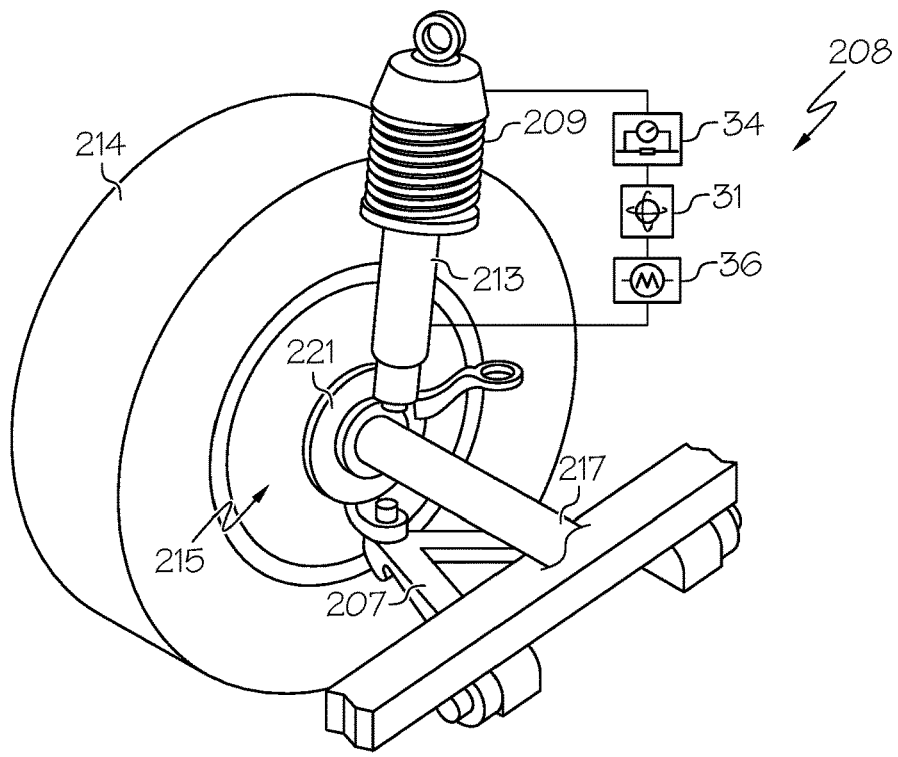
FIG. 2B depicts a schematic of a suspension of the trailer of FIG. 1, according to one or more embodiments shown and described herein.

Referring now to FIGS. 2A and 2B, the vehicle suspension 110 and the trailer suspension 208 will be described in greater detail with reference to the figures. FIG. 2A shows an example embodiment of the front suspension 112 of the vehicle 100. Components of the front suspension 112 shown in FIG. 2A may also be included in the rear suspension 114. The front suspension 112 generally includes vehicle components that connect the vehicle frame 108 to the front wheels 116. These components may include, for example, control arms 107 and/or chassis members including a spring 109, a strut 111, and a shock absorber 113. One or more of the spring 109, the strut 111, and the shock absorber 113 may be coupled to a knuckle assembly 115 including a hub 121. The front suspension 112 may also include a steering mechanism such as the steering link 125. The front wheels 116 and the rear wheels 118 may be coupled to one or more hubs and thus connected to the front suspension 112 and the rear suspension 114. The front suspension 112 may also include one or more mechanical, electromechanical, or electrical systems for measuring a displacement of the suspension or for affecting one or more changes to the suspension as will be described in greater detail herein. For example, the front suspension 112 may include one or more of accelerometers 31, transducers 34, or servomechanisms 36 for measuring the displacement and/or affecting change to the vehicle suspension 110. The rear suspension 114 may include similar components as depicted with respect to the front suspension 112 shown in FIG. 2A.

Components of the trailer suspension 208 are shown in FIG. 2B. The front trailer suspension 210 may include, for example, control arms 207 and/or chassis members including a spring 209, a strut 211, and a shock absorber 213. One or more of the spring 209, the strut 211, and the shock absorber 213 may be coupled to a knuckle assembly 215 including a hub 221. Components of the trailer suspension 208 may also include one or more mechanical, electromechanical, or electrical systems for measuring a displacement of the suspension or for affecting one or more changes to the trailer suspension 208 as will be described in greater detail herein. For example, the trailer suspension 208 may include one or more of accelerometers 31, transducers 34, or servomechanisms 36 for measuring the displacement and/or affecting change to the trailer suspension 208. The rear trailer suspension 216 may include similar components.

Figure 3:
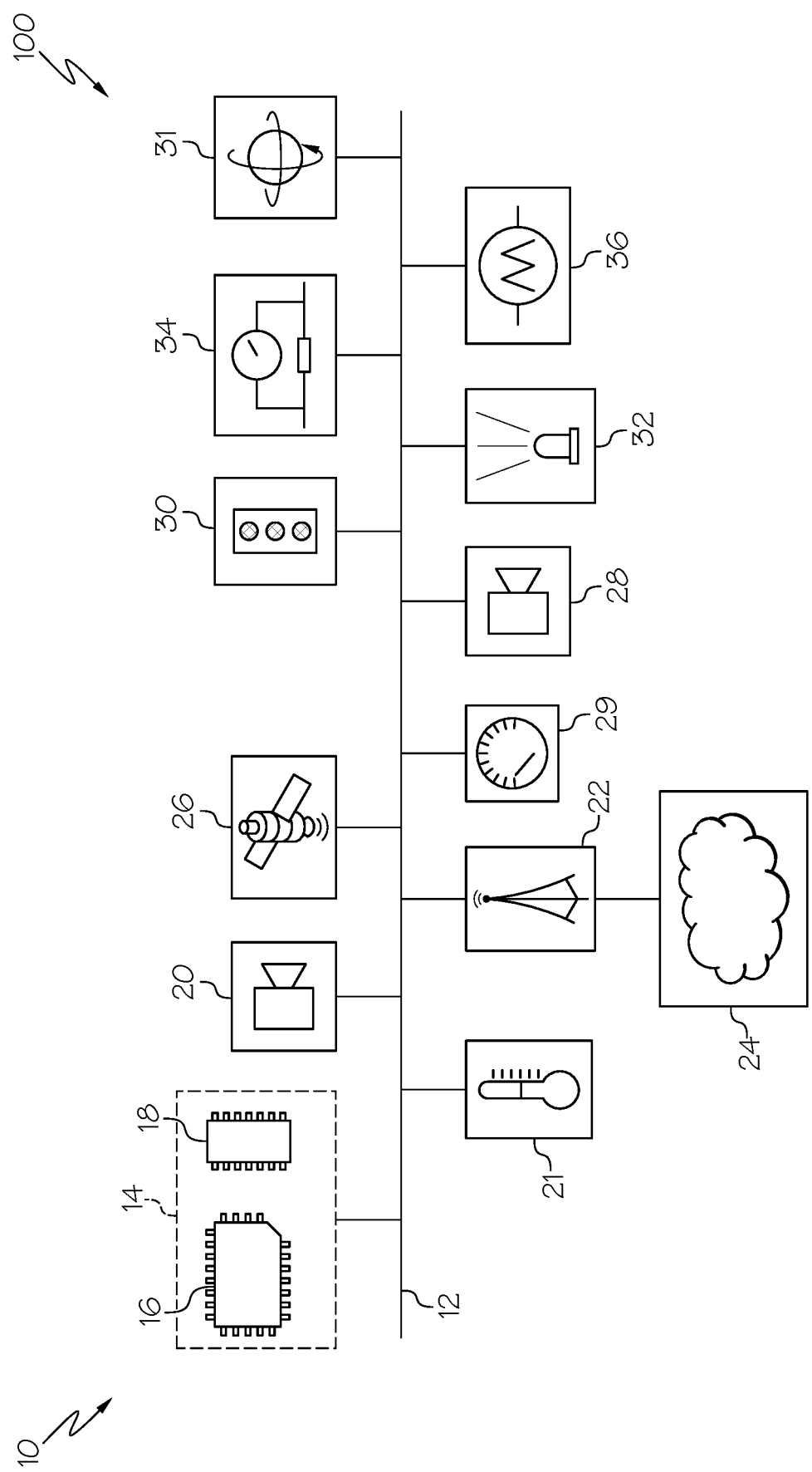
FIG. 3 schematically depicts the excessive tongue weight alert system of the vehicle of FIG. 1, according to one or more embodiments shown and described herein.

Referring now to FIG. 3, a schematic representation of the excessive tongue weight alert system 10 of the vehicle 100 is depicted. The excessive tongue weight alert system 10 may generally comprise a communication path 12, an electronic control unit 14 including a processor 16 and a non-transitory computer readable memory 18, at least one externally facing camera 20, and network interface hardware 22. The vehicle 100 may be coupled to a network 24 by the network interface hardware 22. The excessive tongue weight alert system 10 may be coupled to or include a GPS system 26 and one or more onboard reflexive sensors such as one or more internally facing cameras 28 and/or one or more speedometers 29. The excessive tongue weight alert system 10 may further include one or more external environment sensors 21 for sensing the external environment.

The excessive tongue weight alert system 10 may further include one or more devices for alerting the driver or passengers of the vehicle 100 that an excessive tongue weight condition exists. The excessive tongue weight alert system may include one or more speakers 30, one or more alarm lights 32, and/or other devices such as haptic feedback devices for alerting the driver or passengers of the vehicle 100 to an excessive tongue weight condition. The excessive tongue weight alert system 10 may further include one or more transducers 34 and/or one or more accelerometers 31 for measuring the displacement of the suspension or shocks or struts coupled to the suspension and one or more servomechanisms 36 for adjusting a height of the suspension. The components of the excessive tongue weight alert system 10 may be contained within or mounted to the vehicle 100. The various components of the excessive tongue weight alert system 10 and the interaction thereof will be described in detail below.

The communication path 12 may be formed from any medium that is capable of transmitting a signal such as, for example, conductive wires, conductive traces, optical waveguides, or the like. The communication path 12 may also refer to the expanse in which electromagnetic radiation and their corresponding electromagnetic waves traverses. Moreover, the communication path 12 may be formed from a combination of mediums capable of transmitting signals. In one embodiment, the communication path 12 comprises a combination of conductive traces, conductive wires, connectors, and buses that cooperate to permit the transmission of electrical data signals to components such as processors, memories, sensors, input devices, output devices, and communication devices. Accordingly, the communication path 12 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 12 communicatively couples the various components of the excessive tongue weight alert system 10. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 14 may be any device or combination of components comprising a processor, such as the processor 16, and a memory, such as the non-transitory computer readable memory 18. The processor 16 of the excessive tongue weight alert system 10 may be any device capable of executing the machine-readable instruction set stored in the non-transitory computer readable memory 18 or in the network 24. Accordingly, the processor 16 may be an electric controller, an integrated circuit, a microchip, a computer, or any other computing device. The processor 16 is communicatively coupled to the other components of the excessive tongue weight alert system 10 by the communication path 12. Accordingly, the communication path 12 may communicatively couple any number of processors with one another, and allow the components coupled to the communication path 12 to operate in a distributed computing environment. Specifically, each of the components may operate as a node that may send and/or receive data. While the embodiment depicted in FIG. 3 includes a single processor, that is, the processor 16, other embodiments may include more than one processor.

The non-transitory computer readable memory 18 of the excessive tongue weight alert system 10 is coupled to the communication path 12 and communicatively coupled to the processor 16. The non-transitory computer readable memory 18 may comprise RAM, ROM, flash memories, hard drives, or any non-transitory memory device capable of storing machine-readable instructions such that the machine-readable instructions can be accessed and executed by the processor 16. The machine-readable instruction set may comprise logic or algorithm(s) written in any programming language of any generation (e.g., 1GL, 2GL, 3GL, 4GL, or 5GL) such as, for example, machine language that may be directly executed by the processor 16, or assembly language, object-oriented programming (OOP), scripting languages, microcode, etc., that may be compiled or assembled into machine readable instructions and stored in the non-transitory computer readable memory 18. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 3 includes a single non-transitory computer readable memory, other embodiments may include more than one non-transitory computer readable memory.

Still referring to FIG. 3, the at least one externally facing camera 20 may be coupled to the communication path 12 and communicatively coupled to the electronic control unit 14 and consequently the processor 16. The at least one externally facing camera 20 may be any device having an array of sensing devices (e.g., pixels) capable of detecting radiation in an ultraviolet wavelength band, a visible light wavelength band, or an infrared wavelength band. The at least one externally facing camera 20 may include or be associated with a night vision system or low light system. The at least one externally facing camera 20 may have any resolution; however, high resolution may provide for enhanced light and object identification and detection. The at least one externally facing camera 20 may be an omnidirectional camera, or a panoramic camera. In some embodiments, one or more optical components, such as a mirror, fish-eye lens, or any other type of lens may be optically coupled to each of the at least one externally facing camera 20. The at least one externally facing camera 20 may be positioned within or on the vehicle 100 to view the environment external to the vehicle 100. For example, without limitation, the at least one externally facing camera 20 may be positioned on the dashboard of the vehicle 100 to capture images of the surroundings in front of the vehicle 100 during operation. The position of the at least one externally facing camera 20 is not limited to any particular position on or within the vehicle 100. The at least one externally facing camera 20 may be positioned anywhere on or within the vehicle 100 to capture images of surroundings of the vehicle 100 during operation.

The at least one externally facing camera 20 may capture images of the surroundings of the vehicle and generate image data which is communicated to the electronic control unit 14 and the processor 16. The processor 16 may employ one or more object recognition algorithms to the image data to extract objects and features. Any known or yet-to-be-developed object recognition algorithms may be used to extract the objects and features from the image data. Example object recognition algorithms include, but are not limited to, scale-invariant feature transform ("SIFT"), speeded up robust features ("SURF"), and edge-detection algorithms. The object recognition algorithms may be stored in the non-transitory computer readable memory 18 or in the network 24 and executed by the processor 16.

Still referring to FIG. 3, the excessive tongue weight alert system may further include the one or more external environment sensors 21. The external environment sensors 21 may include one or more of a moisture sensor, a light sensor, a barometer, a wind gauge, or other sensor configured to sense a condition of the external environment. As one non-limiting example of an external environment sensor, a moisture sensor may detect the presence of moisture on a surface, such as a road, or in the air, such as humidity, and thus may help determine a present or future weather condition (e.g., determine whether it is raining). As another example, a light sensor may be used to determine the external lighting characteristics of the environment in which the vehicle 100 is operating. The present or future weather condition or the external lighting characteristics, for example, may be used as inputs to affect one or more changes to the excessive tongue weight alert system 10.

Still referring to FIG. 3, a global positioning system, such as the GPS system 26, may be coupled to the communication path 12 and communicatively coupled to the electronic control unit 14. The GPS system 26 is capable of generating location information indicative of a location of the vehicle 100 by receiving one or more GPS signals from one or more GPS satellites. The GPS signal communicated to the electronic control unit 14 via the communication path 12 may include location information comprising a National Marine Electronics Association (NMEA) message, latitude and longitude data set, a street address, a name of a known location based on a location database, or the like. Additionally, the GPS system 26 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

The network interface hardware 22 is coupled to the communication path 12 and communicatively coupled to the electronic control unit 14. The network interface hardware 22 may be any device capable of transmitting and/or receiving data via a network 24. Accordingly, network interface hardware 22 can include a communication transceiver for sending and/or receiving any wired or wireless communication. For example, the network interface hardware 22 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 22 includes hardware configured to operate in accordance with the Bluetooth wireless communication protocol. In another embodiment, the network interface hardware 22 may include a Bluetooth send/receive module for sending and receiving Bluetooth communications to/from a network 24. The network interface hardware 22 may also include a radio frequency identification ("RFID") reader configured to interrogate and read RFID tags.

In some embodiments, the excessive tongue weight alert system 10 may be communicatively coupled to nearby vehicles via the network 24. In some embodiments, the network 24 is a personal area network that utilizes Bluetooth technology to communicatively couple the excessive tongue weight alert system 10 and nearby vehicles to provide information to and receive information from nearby vehicles. For example, the excessive tongue weight alert system 10 may provide a warning to nearby vehicles of excessive tongue weight. In other embodiments, the network 24 may include one or more computer networks (e.g., a personal area network, a local area network, or a wide area network), cellular networks, satellite networks and/or a global positioning system and combinations thereof. Accordingly, the excessive tongue weight alert system 10 can be communicatively coupled to the network 24 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 3, as stated above, the network 24 may be utilized to communicatively couple the excessive tongue weight alert system 10 with nearby vehicles. The nearby vehicles may include network interface hardware and an electronic control unit having a processor and non-transitory computer readable memory capable of being communicatively coupled with the excessive tongue weight alert system 10 of the vehicle 100. A processor of the nearby vehicle or vehicles may execute a machine-readable instruction set stored in a non-transitory computer readable memory or in another network to communicate with the excessive tongue weight alert system 10.

The one or more reflexive sensors such as the one or more internally facing cameras 28 and the speedometer 29 may provide information about the vehicle 100 and its contents and condition to the operators of the vehicle, such as the driver and/or the passengers of the vehicle 100. The one or more reflexive sensors may provide information to the excessive tongue weight alert system 10. For example, the one or more internally facing cameras 28 may face the cabin of the vehicle 100. In some embodiments, if the one or more internally facing cameras 28 detect one or more passengers within the vehicle 100, a signal may be generated that in the case of an excessive tongue weight condition, one or more alarms need to be generated to alert the passengers of the vehicle 100. Conversely, if no passengers are detected, no alarm may be generated inside the cabin 120 of the vehicle 100, and instead an alarm may be generated remotely. In some embodiments, the reflexive sensors may be used to determine where to activate an alarm within the cabin 120. For example, in the case of a haptic alarm that vibrates a passenger's seat, the alarm may only be generated in the seats where a passenger is sitting.

Additionally, the one or more reflexive sensors may be used as inputs to the excessive tongue weight alert system 10. For example, the speed of the vehicle 100 as measured by the speedometer 29 may be used to determine the likelihood that the vehicle may lose control in an excessive tongue weight condition. Other reflexive sensors are possible, for example sensors that detect a drivetrain condition of the vehicle (e.g., four-wheel, two-wheel, all-wheel drive, etc.), sensors that detect whether individual wheels are applying force or experiencing resistance, or sensors that measure the suspension deflection or loading.

The one or more speakers 30 and the one or more alarm lights 32 may be used to alert the driver and/or passengers of the vehicle 100 that an excessive tongue weight condition exists. The speakers 30 may broadcast an audible warning generated by the electronic control unit 14 or other component of the excessive tongue weight alert system 10. The one or more alarm lights 32 may be used to visually alert drivers of an excessive tongue weight condition.

Still referring to FIG. 3, the excessive tongue weight alert system 10 may further comprise the one or more accelerometers 31 for measuring a movement of the vehicle 100, the trailer 200, or both. The accelerometers 31 may measure the displacement, the velocity, and/or the acceleration of the vehicle 100 and/or the trailer 200. In various embodiments, the accelerometers may be strain gauges, piezoelectric gauges, capacitive accelerometers, triaxial accelerometers or some other combination or type of accelerometer now known or to be discovered. The accelerometers 31 may be used to calibrate an image from the at least one externally facing camera 20 as will be described in greater detail herein.

Still referring to FIG. 3, the excessive tongue weight alert system 10 may further comprise one or more transducers 34 for measuring the height or the change in height of the front suspension 112 and the rear suspension 114. The vehicle 100 may further include one or more transducers 34 for measuring the weight of the vehicle 100, the trailer 200, the tongue weight at the tongue 220, or both. The transducers 34 may be passive or active sensors. The vehicle 100 may include at least one front suspension transducer and at least one rear suspension transducer as will be described in greater detail herein. The trailer 200 may also include one or more transducers 34 coupled to the trailer suspension 208. The excessive tongue weight alert system 10 may measure the displacement of at least one spring coupled to the front suspension and/or the rear suspension to calculate a vehicle angle and/or may measure the displacement and/or differential pressure of other components, for example, the shock absorber 113, 213 to calculate a vehicle angle.

The excessive tongue weight alert system 10 may measure the height or change in height of the front suspension 112 and the rear suspension 114 to determine whether an excessive tongue weight condition exists. In some embodiments, the excessive tongue weight alert system 10 may measure the compression of a spring of the front suspension 112 or the rear suspension 114 to determine the change in height of the front suspension 112 or the rear suspension 114. In some embodiments, the excessive tongue weight alert system 10 may measure a differential pressure of suspension fluid or some other fluid in the front suspension 112 or the rear suspension 114 to measure the height or change in height of the front suspension 112 and the rear suspension 114. In some embodiments, the excessive tongue weight alert system 10 may measure the weight of the vehicle 100, the trailer 200, or the tongue 220 directly. In some embodiments, the measurements may be compared and verified against one another. If an excessive tongue weight condition exists, the excessive tongue weight alert system 10 may cause one or more actions to take place.

Still referring to FIG. 3, the excessive tongue weight alert system 10 may include one or more servomechanisms 36 for adjusting the height of the vehicle suspension 110. The servomechanisms 36 may provide position control for the front suspension 112, the rear suspension 114, or both. The servomechanisms 36 may be electrically, hydraulically, or mechanically actuated. The servomechanisms 36 may be controlled by one or more other components of the excessive tongue weight alert system 10, such as the electronic control unit 14. The servomechanisms 36 may be placed at or near the vehicle suspension 110 such that they can affect the components of the vehicle suspension 110.

Figure 4:
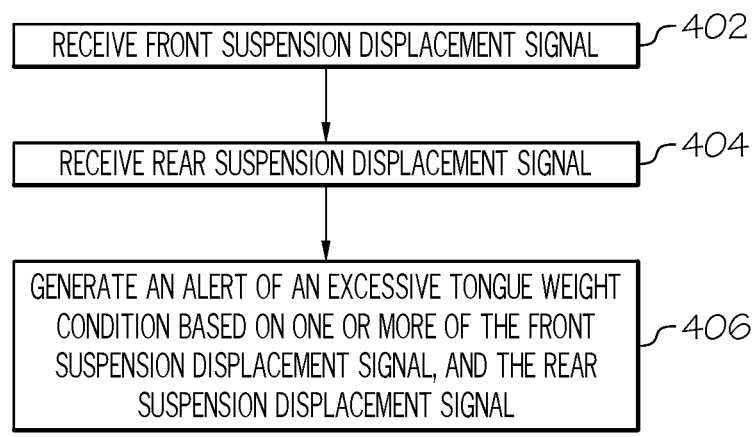
FIG. 4 depicts a method for alerting a driver of an excessive tongue weight condition in a vehicle using one or more transducers to sense a posture of the vehicle of FIG. 1, according to one or more embodiments shown and described herein.

FIG. 4 depicts a flow chart for receiving and responding to an excessive tongue weight alert using the excessive tongue weight alert system of FIGS. 1-3. Referring to FIG. 4 and describing the components shown in FIGS. 1-3, at block 402, the electronic control unit receives a front suspension displacement signal. The front suspension displacement signal may be proportional to the displacement of the front suspension with respect to the ground or other surface upon which the vehicle 100 is supported as compared to a calibrated front suspension displacement signal. In some embodiments, the calibrated front suspension displacement signal may be changed or recalibrated over time, for example as the height of the suspension gradually lowers over time. The front suspension displacement signal may be generated by one or more of the one or more transducers 34, the at least one externally facing camera 20, and the one or more accelerometers 31. For example, the front suspension displacement signal may be a signal generated by a combination of the one or more transducers 34, the at least one externally facing camera 20, and the one or more accelerometers 31. In some embodiments, the front suspension displacement signal from one or more of these systems may be averaged and/or filtered against the signal from other systems to generate the front suspension displacement signal.

At block 404, the electronic control unit receives a rear suspension displacement signal. The rear suspension displacement signal may be proportional to the displacement of the rear suspension with respect to the ground or other surface upon which the vehicle 100 is supported as compared to a calibrated rear suspension displacement signal. In some embodiments, the calibrated rear suspension displacement signal may be changed or recalibrated over time, for example as the height of the suspension gradually lowers over time. The rear suspension displacement signal may be generated by one or more of the one or more transducers 34, the at least one externally facing camera 20, and the one or more accelerometers 31. For example, the rear suspension displacement signal may be a signal generated by a combination of the one or more transducers 34, the at least one externally facing camera 20, and the one or more accelerometers 31. In some embodiments, the rear suspension displacement signal from one or more of these systems may be averaged and/or filtered against the signal from other systems to generate the rear suspension displacement signal.

At block 406, the vehicle 100 may generate an alert of an excessive tongue weight condition based on one or more of front suspension displacement signal and the rear suspension displacement signal. The front suspension displacement signal and/or the rear suspension displacement signal may be proportional to the angle of the vehicle 100 with respect to the ground or other surface upon which the vehicle 100 is supported.

In some embodiments, the vehicle 100 may be configured to determine a vehicle angle based on one or more of the front suspension displacement signal and the rear suspension displacement signal. The vehicle angle may be compared to a vehicle angle threshold. The vehicle angle threshold may be a maximum vehicle angle for proper operation of the vehicle 100 under current trailer loading conditions. In some embodiments, the vehicle angle threshold may be factored against the maximum vehicle angle for proper operation by some scaling factor. For example, if the maximum vehicle angle is X, but the operator of the vehicle would prefer to remain at least Y degrees from the maximum vehicle angle X, the vehicle angle threshold may be set to Z degrees, where Z=X+Y degrees.

In some embodiments, one or more of the vehicle angle and/or a vehicle angle signal may be verified using data generated by the at least one externally facing camera 20. In such embodiments, the verified data may be used as the input in the combination step and/or the comparison step discussed above. For example, a displacement of the front suspension 112 and the rear suspension 114 may be measured using the one or more transducers 34 attached at the front suspension 112 and the rear suspension. The values of the displacement may be compared and used to calculate a vehicle angle as discussed above. Meanwhile, the electronic control unit or some other component may measure a separate vehicle angle and/or generate a separate vehicle angle signal based on visual data, a visual data vehicle angle signal or a visual vehicle angle. The vehicle angle may then be compared against the visual data vehicle angle signal.

In some embodiments, the excessive tongue weight alert system 10 may generate an alert if the vehicle angle exceeds the vehicle angle threshold. The alert may alert one or more of the driver and/or passengers of the vehicle and the other vehicles in the vicinity of the vehicle 100 through one or more network connections. In some embodiments, the alert may be configured to alert one or more emergency responders or other outside entities. The alert generated may be a visual, audible, or haptic alert.

In some embodiments, the vehicle may generate a separate alarm if the vehicle angle based on the transducer signal and the visual data are not equivalent or within a certain threshold. Such an alarm may alert a user of the vehicle that one or more of the transducers 34 in the front suspension 112 and the rear suspension 114 or the at least one externally facing camera 20 or both are out of calibration.

In some embodiments, the electronic control unit may be configured to develop a predicted vehicle angle for all locations along a planned route. The electronic control unit may receive inputs from the one or more transducers 34, the at least one externally facing camera 20, the one or more accelerometers 31, and/or some other system to develop a current weight distribution profile of the weight in the vehicle 100 and the trailer 200. The current weight distribution profile may be combined with route data from one or more navigation systems or similar systems that comprises data regarding the grade and surface characteristics of a road along a route. The current weight distribution profile and the route data may be used to develop the predicted vehicle angle for all the locations along a route. The predicted vehicle angle may be used to change a route based on certain criteria, for example, if the predicted vehicle angle exceeds a predicted vehicle angle threshold.

In some embodiments, the electronic control unit may be configured to receive a trailer suspension displacement signal based on a displacement of one or more of a displacement of the front trailer suspension and the rear trailer suspension. The trailer displacement signal may be proportional to the displacement of the front trailer suspension 210 and/or the rear trailer suspension 212 with respect to the ground or other surface upon which the vehicle 100 is supported as compared to a calibrated front suspension displacement signal. In some embodiments, the calibrated front suspension displacement signal may be changed or recalibrated over time, for example as the height of the suspension gradually lowers over time. The trailer displacement signal may be generated by one or more of the one or more transducers 34, the at least one externally facing camera 20, and the one or more accelerometers 31. For example, the trailer displacement signal may be a signal generated by a combination of the one or more transducers 34, the at least one externally facing camera 20, and the one or more accelerometers 31. In some embodiments, the trailer displacement signal from one or more of these systems may be averaged and/or filtered against the signal from other systems to generate the trailer displacement signal. The trailer suspension displacement signal may be used to determine one or more of a vehicle angle and a trailer angle. The vehicle angle may be compared to a vehicle angle threshold. The vehicle angle threshold may be a maximum vehicle angle for proper operation of the vehicle 100 under current trailer loading conditions. In some embodiments, the vehicle angle threshold may be factored against the maximum vehicle angle for proper operation by some scaling factor. For example, if the maximum vehicle angle is X, but the operator of the vehicle would prefer to remain at least Y degrees from the maximum vehicle angle X, the vehicle angle threshold may be set to Z degrees, where Z=X+Y degrees.

Figure 5:
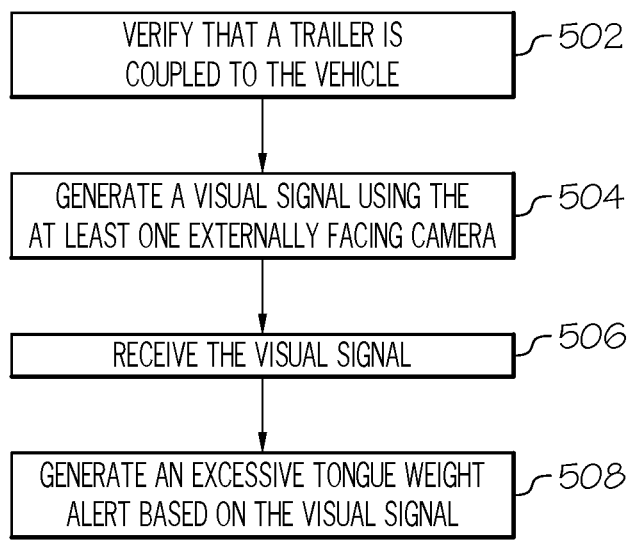
FIG. 5 depicts a method for alerting a driver of an excessive tongue weight condition in a vehicle using one or more cameras to sense a posture of the vehicle of FIG. 1, according to one or more embodiments shown and described herein.

FIG. 5 depicts a flow chart for receiving and responding to an excessive tongue weight alert using the excessive tongue weight alert system of FIGS. 1-3. Referring to FIG. 5 and describing the components shown in FIGS. 1-3, at block 502, the excessive tongue weight alert system 10 may verify that a trailer 200 is coupled to the vehicle 100. The excessive tongue weight alert system 10 may verify this so that erroneous alerts are not generated when there is no trailer 200 coupled to the vehicle 100. Whether a trailer 200 is coupled to the vehicle 100 may be verified by any suitable means, non-limiting examples including using the at least one externally facing camera 20, using the internally facing camera 28 to register a gesture of a user of the vehicle 100 after posing a question to the user of the vehicle 100, or by some other means.

At block 504, the excessive tongue weight alert system 10 may generate a visual signal using the at least one externally facing camera 20. In some embodiments, the visual signal may be generated while the vehicle 100 is stationary, such as while it is parked in a garage or when it has first connected to the trailer 200. In some embodiments, the visual signal may be generated dynamically while the vehicle 100 is towing the trailer 200. For example, the visual signal may be continuously received from the at least one externally facing camera 20.

At block 506, the electronic control unit 14 receives the visual signal. Based on the visual signal, the excessive tongue weight alert system may generate an alert as depicted at block 508. The alert may alert one or more of the driver and/or passengers of the vehicle and the other vehicles in the vicinity of the vehicle 100 through one or more network connections. In some embodiments, the alert may be configured to alert one or more emergency responders or other outside entities. The alert generated may be a visual, audible, or haptic alert.

In some embodiments, the visual signal may be used to generate a visual vehicle angle signal. To generate the visual vehicle angle signal, the electronic control unit 14 may compare the visual signal with calibrated visual data to determine the difference between the current vehicle angle and a calibrated angle. The calibrated visual data may be generated when the vehicle 100 is unloaded at the trailer hitch 130 or is at rest or at a known angle, such as a neutral angle. The known angle may be determined by generating an angle signal using the one or more accelerometers 31 communicatively coupled to the electronic control unit 14.

In some embodiments, the vehicle 100 compares an image from the at least one externally facing camera 20 when in an at rest position to an image from the at least one externally facing camera 20 when the vehicle 100 is in a loaded condition (i.e., there is weight at the trailer hitch 130). By comparing the difference between the images, the visual vehicle angle signal can be generated.

The visual vehicle angle signal may be compared to the vehicle angle threshold. The vehicle angle threshold may be a maximum vehicle angle for proper operation of the vehicle 100 under current trailer loading conditions. In some embodiments, the vehicle angle threshold may be factored against the maximum vehicle angle for proper operation by some scaling factor. For example, if the maximum vehicle angle is X, but the operator of the vehicle would prefer to remain at least Y degrees from the maximum vehicle angle X, the vehicle angle threshold may be set to Z degrees, where Z=X+Y degrees.

Figure 6:
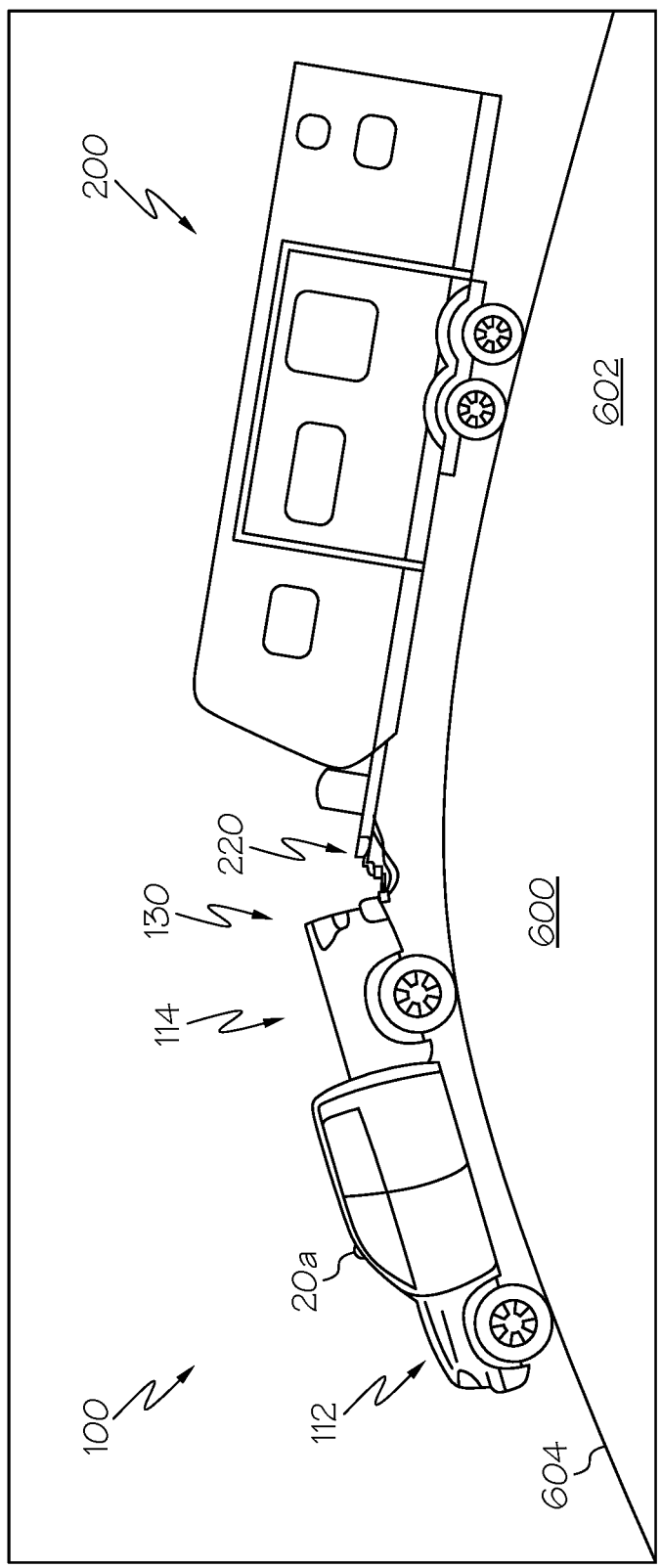
FIG. 6 depicts an example of an excessive tongue weight situation showing the vehicle and trailer of FIG. 1, according to one or more embodiments shown and described herein.

Referring now to the scenario depicted in FIG. 6 and the components and systems depicted in FIGS. 1-3, an example scenario in which an alert from the excessive tongue weight alert system 10 is initiated is depicted. In FIG. 6, the vehicle 100 is towing the trailer 200 over a crest 600 of a hill 602 in a roadway 604. The vehicle 100 is across the crest 600, but the trailer 200 has not yet reached the crest 600. As the vehicle 100 crosses the crest, the weight of the trailer 200 shifts with respect to the trailer hitch 130 and produces an excessive tongue weight situation for the vehicle 100 and the trailer 200. In the example scenario, the weight of the trailer 200 is placing too much of the load on the rear suspension 114 of the vehicle 100 and too little weight on the front suspension 112 of the vehicle 100. This could lead to a loss of vehicle control.

The shift in weight may be sensed by the transducers 34 in both the front suspension 112 and the rear suspension 114. For example, the transducers 34 at the front suspension 112 may sense the reduction in load at the front suspension 112 and the transducers 34 at the rear suspension 114 may experience an increase in load. The transducers 34 at the front and the transducers 34 at the rear of the vehicle 100 may generate signals that reflect the altered loading condition.

Simultaneously, a forward facing camera 20a may detect one or more portions of the roadway 604 in front of the vehicle 100. The forward facing camera 20a may generate a forward visual signal and may use image data of the roadway to determine the emergence of the excessive tongue weight condition. The forward facing camera 20a or other cameras may detect and calculate an angle of the roadway 604, the vehicle 100, and/or the trailer 200 to determine whether an excessive tongue weight condition exists or may exist.

In some embodiments, the vehicle 100 may generate an excessive tongue weight alert based on a sensed condition of the vehicle. In some embodiments, the excessive tongue weight alert may be based on whether a trailer, such as the trailer 200, is coupled to the vehicle 100 or not. For example, the vehicle 100 may use a camera such as the at least one externally facing camera 20 of FIG. 3 to verify that the trailer 200 is coupled to the vehicle 100. The vehicle 100 may also generate a visual signal using the at least one externally facing camera 20. The vehicle 100 may receive the visual signal and based on the visual signal, generate an excessive tongue weight alert.

In some embodiments, the current load conditions of the vehicle 100 may be sensed by the various onboard sensors and recorded. A log of load conditions and vehicle response to the load conditions may be kept in storage locations on the vehicle 100 or external to the vehicle 100 such as in the network 24. The log of load conditions may be used to predict when an excessive overload condition may exist and to alert drivers to conditions that would put the vehicle in an excessive tongue weight condition. For example, the vehicle 100 may learn over time that if a given vehicle experiences a given tongue weight and approaches a segment of road that exceeds a particular angle or a segment of road that includes an abrupt angle change from X degrees to Y degrees in grade, that an excessive tongue weight situation may exist.

In such a scenario, the vehicle 100 may be equipped with one or more items of equipment or be programmed with one or more programs to counteract the excessive tongue weight condition. For example, if the vehicle 100 knows that, given current loading conditions, an excessive tongue weight condition will occur if the vehicle experiences a change in grade from 30 to −30 degrees, the vehicle 100 may warn the driver and/or passengers of the vehicle of upcoming changes in grade that exceed this magnitude. As another example, in vehicles equipped with navigation systems, if an excessive road grade or change in road grade is detected upon a pre-planned route, the vehicle 100 may alter the route to a route with no grades or changes in grade that exceed the maximum set point.

Additionally, in some embodiments, the one or more servomechanisms 36 may be used to dynamically alter a suspension height of the front suspension 112, the rear suspension 114, or both in response to a possible excessive tongue weight condition. The one or more servomechanisms 36 in combination with the electronic control unit 14, may be configured to change the height of the front suspension 112, the rear suspension 114, or both on manual command from a user of the vehicle 100 and/or autonomously. In some embodiments, the servomechanisms 36 may automatically update a height of one or more components of the vehicle suspension 110 in response to a predicted excessive tongue weight condition. The automatic update may be based on a predicted road grade along a route, for example. In some embodiments, the vehicle suspension 110 may continuously update automatically based on sensor input from one or more of the transducers 34, the accelerometers 31, the at least one externally facing camera 20, the external environment sensors 21 or other sensors of the excessive tongue weight alert system 10. In some embodiments, the vehicle 100 may automatically update a suspension height based on data sent from other vehicles. For example, if a caravan of vehicles hauling trailers (e.g., a caravan of campers) are travelling along a highway and an unexpected or unreported road condition exists, such as a large pile of gravel along a road, the first member of the caravan may send data regarding an unexpected road grade due to the gravel. In some cases, a vehicle may be configured to calculate a road grade before or as it passes over an object. For example, if the first vehicle passes over the pile of gravel, it might calculate a change in the grade as it passes over the gravel and the effect the pile has on the vehicle and its trailer. In some embodiments, a vehicle may be configured to calculate a road grade for an unexpected position based on an image or images of the road including the unexpected condition and send the calculated road grade to other vehicles or an external network. For example, a vehicle might send data that is calculated using images of the gravel in the example above to others in the caravan to predict excessive tongue weight conditions for the other vehicles in the caravan.

It should now be understood that a system and method for providing an excessive tongue weight alert to a driver and/or passengers of a vehicle may prevent affected performance of the vehicle and the trailer. By sensing and indicating excessive tongue weight conditions, the excessive tongue weight alert system described herein may help users of vehicles avoid excessive tongue weight situations, and thereby prevent vehicles with altered capabilities or performance due to excessive tongue weight. Moreover, the systems and methods described herein may alert other users of roads on which an excessive tongue weight condition may exist, thereby preventing interaction between external entities and a vehicle with an excessive tongue weight situation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Additionally, the terms driver and passenger may be used interchangeably herein.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a suspension comprising a front suspension and a rear suspension;
   a trailer hitch configured to removably connect to a tongue of a trailer;
   at least one front suspension transducer configured to generate a front suspension displacement signal;
   at least one rear suspension transducer configured to generate a rear suspension displacement signal; and
   an electronic control unit configured to:
      receive the front suspension displacement signal;
      receive the rear suspension displacement signal;
      generate an alert of an excessive tongue weight condition based on one or more of the front suspension displacement signal and the rear suspension displacement signal; and
      adjust a height of one or more of the front suspension and the rear suspension based on one or more of the front suspension displacement signal and the rear suspension displacement signal and in response to the alert of the excessive tongue weight condition.

2. The vehicle of claim 1, wherein the front suspension displacement signal is proportional to a displacement of the front suspension as compared to a calibrated front suspension displacement signal and the rear suspension displacement signal is proportional to a displacement of the rear suspension as compared to a calibrated rear suspension displacement signal.

3. The vehicle of claim 1, wherein the electronic control unit is further configured to determine a vehicle angle based on the front suspension displacement signal and the rear suspension displacement signal and to generate the alert of the excessive tongue weight condition based on the vehicle angle.

4. The vehicle of claim 3, wherein the electronic control unit is further configured to compare the vehicle angle to a vehicle angle threshold and to generate the alert of the excessive tongue weight condition based on the comparison.

5. The vehicle of claim 1, further comprising network interface hardware communicatively coupled to the electronic control unit, wherein the electronic control unit is configured to generate a warning and communicate the warning to nearby vehicles with the network interface hardware in response to generating the alert of the excessive tongue weight condition.

6. The vehicle of claim 1, wherein the vehicle is coupled to the trailer and the trailer comprises:
   a trailer suspension; and
   at least one trailer transducer; wherein,
   the trailer transducer configured to generate a trailer suspension displacement signal; and
   the electronic control unit is further configured to receive the trailer suspension displacement signal and to generate the alert of the excessive tongue weight condition based on one or more of the front suspension displacement signal, the rear suspension displacement signal, and the trailer suspension displacement signal.

7. A vehicle comprising:
   a suspension;
   a trailer hitch configured to removably connect to a tongue of a trailer;
   at least one externally facing camera configured to generate a visual signal; and
   an electronic control unit configured to:
      receive the visual signal;
      generate an alert of an excessive tongue weight condition based on the visual signal; and
      adjust a height of the suspension based on the visual signal of the externally facing camera and in response to the alert of the excessive tongue weight condition.

8. The vehicle of claim 7, wherein the electronic control unit is further configured to determine a vehicle angle based on the visual signal and to generate the alert based on the vehicle angle.

9. The vehicle of claim 8, wherein the electronic control unit is further configured to compare the vehicle angle to a vehicle angle threshold and to generate the alert based on the comparison of the vehicle angle and the vehicle angle threshold.

10. The vehicle of claim 9, wherein:
the suspension comprises a front suspension and a rear suspension; and
the electronic control unit is further configured to adjust the height of each of the front suspension and the rear suspension if the vehicle angle exceeds the vehicle angle threshold.

11. The vehicle of claim 7, wherein the at least one externally facing camera faces in a vehicle rearward direction.

12. The vehicle of claim 11, wherein the electronic control unit is further configured to:
recognize a presence of the trailer connected to the vehicle; and
only generate the excessive tongue weight alert if the trailer is recognized as connected to the vehicle.

13. The vehicle of claim 12, further comprising a forward facing camera that generates a forward visual signal and wherein:
the vehicle is further configured to generate a vehicle angle signal based on one or more of the visual signal and the forward visual signal.

14. The vehicle of claim 7, wherein the electronic control unit is further configured to generate a warning to nearby vehicles based on the visual signal.

15. An electronic control unit for generating an excessive tongue weight alert for a vehicle, the electronic control unit configured to:
receive a visual signal from at least one externally facing camera communicatively coupled to the electronic control unit;
generate an alert of an excessive tongue weight condition based on the visual signal from the at least one externally facing camera; and
adjust a height of one or more of a front suspension and a rear suspension the vehicle based on the visual signal of the at least one externally facing camera and in response to the alert of the excessive tongue weight condition.

16. The electronic control unit of claim 15, further configured to determine a vehicle angle based on the visual signal received from the at least one externally facing camera and to generate the excessive tongue weight alert based on the vehicle angle.

17. The electronic control unit of claim 16, further configured to compare the vehicle angle to a vehicle angle threshold and to generate the excessive tongue weight alert based on the comparison of the vehicle angle and the vehicle angle threshold.

18. The electronic control unit of claim 15, wherein the at least one externally facing camera faces in a vehicle rearward direction.

19. The electronic control unit of claim 17, further configured to:
recognize a presence of a trailer connected to the vehicle; and
generate the excessive tongue weight alert in response to recognizing a presence of the trailer connected to the vehicle.

20. The vehicle of claim 1, further comprising a navigation system communicatively coupled to the electronic control unit, wherein the electronic control unit is configured to:
analyze a planned route;
predict a predicted excessive tongue weight condition based on the planned route; and
dynamically alter a suspension height of the front suspension, the rear suspension, or both in response to the predicted excessive tongue weight condition.

* * * * *